United States Patent [19]

Schaefer

[11] 4,439,090
[45] Mar. 27, 1984

[54] WORKPIECE HANDLING APPARATUS

[75] Inventor: Wolfgang Schaefer, Isernhagen, Fed. Rep. of Germany

[73] Assignee: Gildemeister AG, Bielefeld, Fed. Rep. of Germany

[21] Appl. No.: 319,661

[22] Filed: Nov. 9, 1981

[30] Foreign Application Priority Data

Nov. 19, 1980 [DE] Fed. Rep. of Germany ....... 3043687

[51] Int. Cl.³ .............................................. B23Q 7/04
[52] U.S. Cl. .................................. 414/736; 414/590; 414/751; 294/88
[58] Field of Search ............... 414/590, 729, 736, 738, 414/739, 115, 751; 294/116, 88, 93, 94, 106; 51/331

[56] References Cited

U.S. PATENT DOCUMENTS

| | | | |
|---|---|---|---|
| 2,767,523 | 10/1955 | Vasbinder | 51/331 |
| 3,371,953 | 3/1968 | Blatt | 294/115 X |
| 3,788,692 | 1/1974 | Fischer | 294/115 X |
| 3,790,205 | 2/1974 | Wenz | 294/115 |
| 4,072,236 | 2/1978 | Nomura et al. | 294/88 X |
| 4,185,866 | 1/1980 | Wittwer | 294/88 |
| 4,227,851 | 10/1980 | Beezer | 294/88 X |
| 4,302,144 | 11/1981 | Hallquist | 414/590 |

FOREIGN PATENT DOCUMENTS

| | | |
|---|---|---|
| 2352575 | 4/1975 | Fed. Rep. of Germany . |
| 2944540 | 5/1980 | Fed. Rep. of Germany . |
| 2035861 | 11/1979 | United Kingdom . |

OTHER PUBLICATIONS

*Maschine + Werkzeug*, Coburg Sondernummer Oktober, 1978, at 36-38.

*Primary Examiner*—Robert J. Spar
*Assistant Examiner*—Terrance L. Siemens
*Attorney, Agent, or Firm*—Wood, Dalton, Phillips, Mason & Rowe

[57] ABSTRACT

A workpiece handling apparatus includes a workpiece gripper having gripping elements and capable of both internal and external gripping functions rotatably attached to a support arm of a manipulation system. The workpiece gripper is controlled by an actuator capable of overcoming spring tension which is applied to the gripping elements.

13 Claims, 6 Drawing Figures

WORKPIECE HANDLING APPARATUS

BACKGROUND OF THE INVENTION

The present invention relates to a workpiece handling apparatus.

Industrial robots are being introduced more and more into modern production technology. These robots can be, for example, workpiece handling apparatus which possess a workpiece gripper by means of which workpieces can be transported from a supply station/storage apparatus to a processing machine and vice versa and/or between processing machines. For this kind of workpiece handling apparatus and particularly for its workpiece gripper, it must be remembered that, on the one hand, the workpieces waiting to be transported may vary in shape and size. On the other, the apparatus must be capable of rotating individual workpieces so that the workpiece may be removed from the supply station in a position and direction other than the one in which it has to be surrendered to the processing machine and/or so that a workpiece can be machined from several sides by means of rotation of the workpiece during the process.

The search for as rational a production as is possible calls for the periods of inactivity of a processing machine to be kept to a minimum. It is advantageous then to provide more than one workpiece gripper in workpiece handling apparatus so that the already processed workpiece can be removed and carried away and, in the main, a workpiece waiting to be processed may be surrendered to this processing machine. A workpiece double gripper might, for example, be suitable for using here.

In order to be able to manipulate as wide a range of workpieces as possible with only one workpiece handling apparatus, it is advantageous to provide different workpiece grippers, adapted as required and to be able to substitute one for another. For example, it is recommended that there is provided workpiece grippers for chuck parts and ones for shafts. These may be inserted into the apparatus as required.

As previously stated, rotation of the workpiece and thereby of the workpiece gripper is an essential requirement of workpiece handling apparatus of this kind. The preferred angle of traverse of the workpiece gripper is 90° spacing. Almost all manipulation tasks arising in connection with processing machines are fulfilled with this spacing.

The workpiece gripper unit has elements which can be moved towards each other, and by means of which it can grasp the workpiece, hold it firmly and then release it again. An adequate gripping force is needed for gripping and a counteracting force corresponding to that is needed for the release of the workpiece. These forces must be controllable in relation to each other in the workpiece gripper. The gripping power can be produced by the spring elements located inside the workpiece gripper. However, the action of a further, external force is necessary for the desired controllability. In the case of rotating, and only then, interchangeable workpiece grippers, the requirement that at least one other force should be transmissible in some way from outside onto the gripping elements of the workpiece gripper should be considered.

In a known workpiece handling apparatus disclosed in DE-OS No. 23 52 575, provision is made for a workpiece gripper and support arm which are both rotatable. The actuator for the gripping elements leads from behind, through the support arm to the gripping jaws. To power it, hydraulic elements are provided in the support arm which admit the hydraulic agent via a hosepipe in a controllable manner. Substitution of the workpiece gripper also calls for a substitution of the support arm as well and disconnection and recoupling of the hydraulic pipes.

Another known workpiece handling apparatus from "Maschine Werkzeug", Coburg, Special number October 1978, does indeed have a workpiece gripper which is rotatable towards the support arm of the apparatus. The actuator described is however, arranged on the gripper, and rotary transmission or flexible hose pipes are provided for putting energy into this actuator. Apart from the fact that the actuator on the workpiece gripper itself enlarges its scope and dimensions in an undesirable way, the devices needed for transmitting energy are sensitive and/or technically costly. A necessary substitution of the workpiece gripper would require disconnection and recoupling of this kind of transmission device.

An object of the present invention is to provide a workpiece handling apparatus whereby, despite rotatability of the workpiece gripper towards the support arm of the apparatus, a technically simple transmission of the controllable actuator of the gripping elements of the workpiece gripper onto this workpiece gripper is ensured. This transmission is done in such a way as to allow different workpiece grippers to be substituted for each other in straightforward manner.

SUMMARY OF THE INVENTION

In the invention the starting point has been the consideration that the actuator, controllable and able to be connected to an energy source, should be a component of the manipulation system and especially of the transport and support arm. This replaces the need to provide in this actuator an oil pressure rotary transmission, hose pipes and the like between the manipulation system and/or the support arm and the workpiece gripper. Furthermore, the invention proceeds from the fact that the actual gripping power of gripping elements in the workpiece gripper depend on the presence of spring elements within the workpiece gripper. The necessary power transmission from the actuator, located for example in the support arm, to the workpiece gripper, whereby the force of this actuator can counteract the spring tension to release the gripping elements, is realized according to one feature of the invention by using a rammer which is located in the workpiece gripper as a connecting link. The spring tension provided within the workpiece gripper has the additional advantage that, should the actuator fail, the workpieces will still be held firmly. The rammer of the workpiece gripper, aligned to a desired rotating position with the actuator in the support arm, has the advantage that, upon release of the direct energy transmission between the actuator and the rammer, e.g., in a state of full impact of the spring tension on the gripping elements, rotation of the workpiece gripper by turning the same on the support arm axis, even disconnecting the workpiece gripper and the support arm from one another, can be accomplished without having to worry about the energy transmission elements. Force-locked contact in a number of desired positions can exist between the rammer and the actuator of the support arm as explained below. A coupling element is provided in the workpiece gripper for a series of gripping elements which coordinates the movement of the individual gripping elements towards each other and with which the spring tension of the spring element located within the workpiece gripper is simultaneously transmitted to all gripping elements of this series. There are preferably two series of gripping elements of this kind provided on the opposite faces of the gripper, each with a coupling element. The actuator which is arranged in the manipulation system, particularly in the support arm, is preferably an hydraulic actuator. Where there is an arrangement of only three drive elements, for example, three simple-to-operate hydraulic cylinders, the workpiece handling apparatus can be used both as a chuck part gripper and as a shaft gripper. With a chuck part gripper, gripping is accomplished in the 0°, 90° and 270° positions for external gripping and 0°, 90° and 270° for internal gripping.

Further explanations of the invention are set down, with the aid of the drawings, in the following description of a preferred exemplified embodiment.

DESCRIPTION OF THE PREFERRED EMBODIMENT

Figure 1:
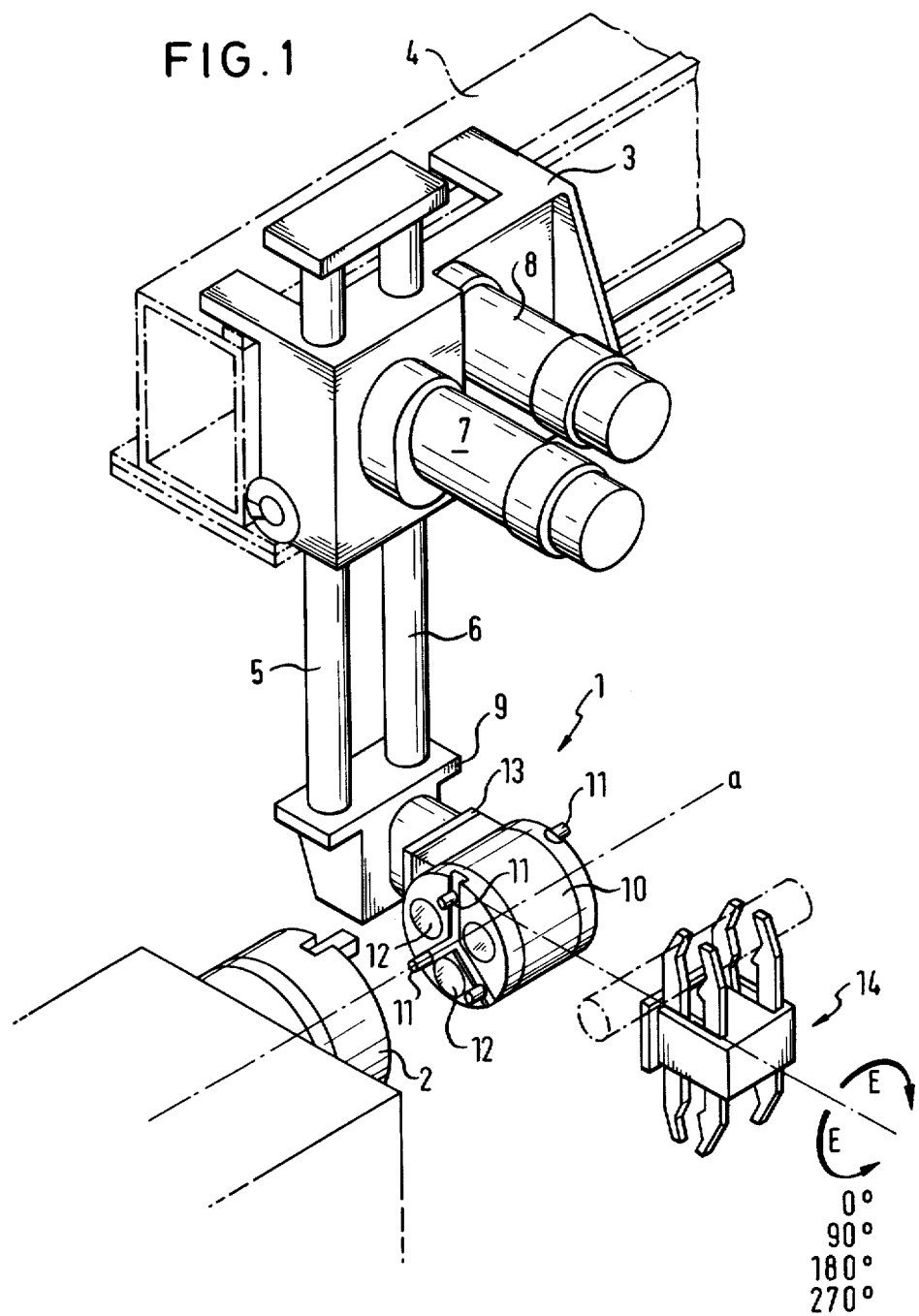
FIG. 1 is a general perspective view of a workpiece handling apparatus according to the invention.

As seen in FIG. 1, a workpiece handling apparatus 1 according to the invention consists of a manipulation system and a workpiece gripper. A chuck 2 of a lathe is also shown with a workpiece gripper 10 and the chuck 2 of the lathe are aligned on a common axis a.

The manipulation system comprises a slide 3 on a frame member 4. Two guide tubes 5, 6 are positioned in the slide 3 which can be vertically displaced by a drive motor 7. The lower ends of the guide tubes 5, 6 pass into a support arm 9, onto which the workpiece gripper 10 is secured. There is a double gripper with gripping elements 11 arranged on either side both facing each other and a pusher 12. The support arm 9 and workpiece gripper 10 are rotatably connected on an axle coupled to a mounting flange or surface 13 so as to be rotatable in the directions of arrows E. Workpiece gripper 10 may readily be removed from support arm 9 and replaced with another workpiece gripper for a different workpiece.

Also shown in FIG. 1 is another workpiece gripper 14 for shafts which can be secured on the mounting flange or surface 13 in place of the workpiece gripper 10, such gripper 14 posessing the same degree of rotatability as denoted by the arrows E.

The positions for rotation of chuck part and shaft grippers, particularly in the form of a double gripper, at 0°, 90° and 180°.

In FIG. 1 only the external housing of support arm 9 is visible. Apart from the axle and drive transmission for rotating the workpiece gripper 10, the support arm 9 also contains the drive elements of the actuator which controls the opening of the gripping elements of workpiece gripper 10 or 14.

Figure 2:
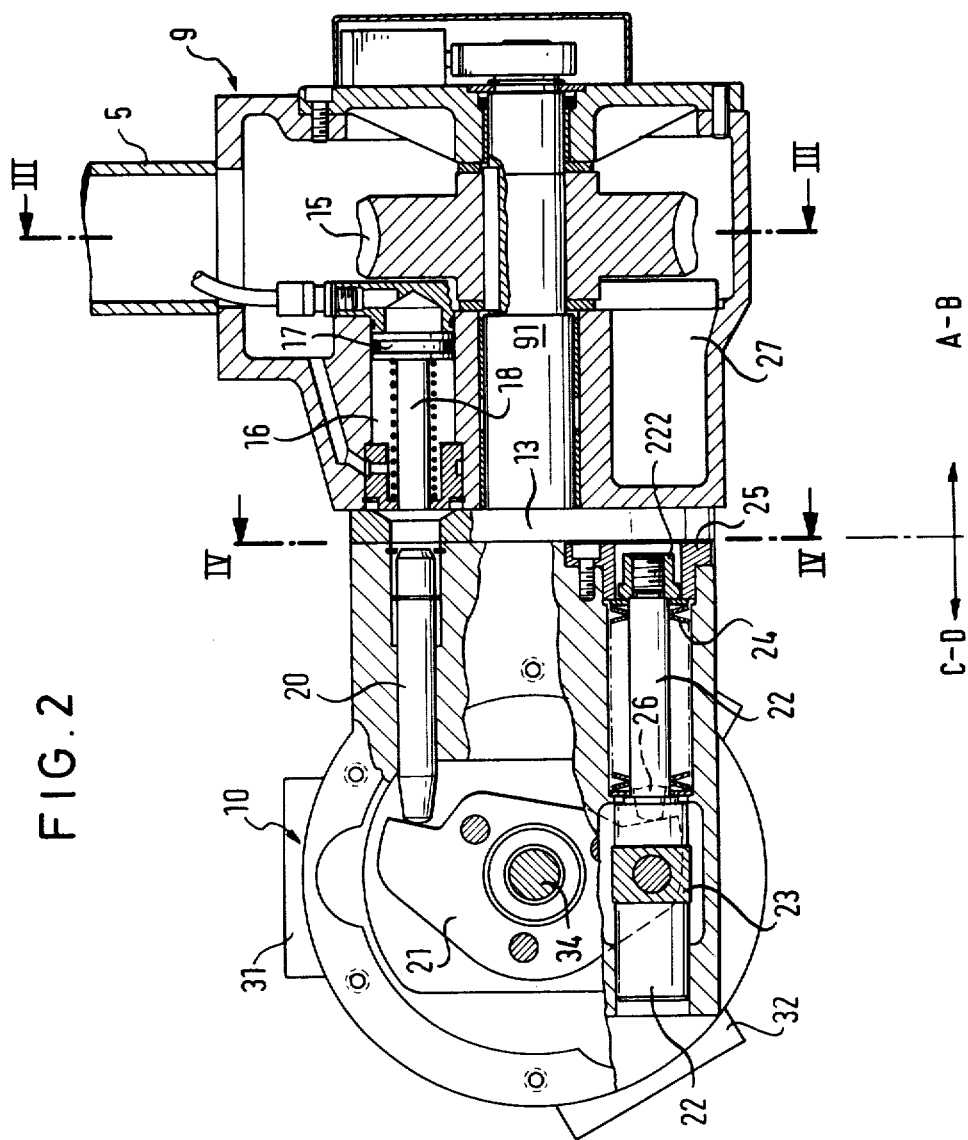
FIG. 2 is a transverse sectional view of the support arm and a workpiece gripper for chuck parts with a multiply-transposed longitudinal section A-B in the right-hand side of the drawing and a longitudinal section C-D double transposed in the left-hand side of the drawing.

Further structural details of the support arm 9 and workpiece gripper 10 can be seen in FIG. 2. This view of support arm 9 is composed of several sections and the workpiece gripper is shown in a displaced transverse section. The housing of support arm 9 is adjacent to the lower end of the guide tube 5 in FIG. 2. Inside there is a worm wheel 15 which is secured to rotating shaft 91. The worm wheel 15 is driven by a worm gear 29, FIG. 3, whose drive shaft 30 runs through the guide tube 6, positioned in front of the guide tube 5, shown in FIG. 2 to the drive motor 8.

In the exemplified embodiment described here, the support arm housing contains several drive elements, each in the form of an hydraulic piston and cylinder unit as an actuator. Of these, the hydraulic cylinder 16 is shown in detail in FIG. 2. There is a piston 17 in the cylinder 16 which is spring-loaded on one side. Its piston rod 18 is the power transmission member from piston 17 onto workpiece gripper 10. In the retracted position or the resting position the left-hand end of the piston rod 18 preferably lies in the plane of the mounting flange. This end of the piston rod 18 extends through the plane of the mounting flange or surface 13 in the active, displaced towards the left position of piston 17 and into the workpiece gripper which is fixed onto the mounting flange 13.

As FIG. 2 shows, there is a rammer or push rod 20 in the workpiece gripper 10. In the case of a workpiece gripper 10 which is secured to the mounting flange 13 and located in a desired rotating position in relation to support arm 9, the rammer or push rod 20 aligns with the piston rod 18. Upon displacement to the left of the piston 17 of the drive element 16 into its active position, the left end of the piston rod 18 meets with the right end of the rammer 20 and motive and compressive force from the piston and piston rod are transmitted wholly onto the rammer 20. This rammer 20 meets one end of a coupler 21 as FIG. 2 clearly shows. Displacement to the left of the rammer 20 with the force of the piston 17 leads to a corresponding rotation of the coupler 11 positioned on the shaft 34.

As can be seen from FIG. 2, the lower end of the coupling element 21 connects via a slide ring 23 to a cup spring bolt 22. The upper and lower ends of the coupler form, in this manner, and in relation to axle 34, a two-ended lever. A rotation counterclockwise of coupler 21, as a result of the rammer 20 being displaced to the left under pressure, leads to a movement to the right of the cup spring bolt 22. A spring element 24 counteracts this movement, however, with a counteracting force. The spring element 24 in this exemplified embodiment is a series of cup springs.

The cup springs of the spring element 24 are arranged in the workpiece gripper 10 under initial stress. In fact, on the left-hand side they abut a shoulder of the housing of workpiece gripper 10 and on the right-hand side they abut a cover 25 which is inserted into the housing of workpiece gripper 10. The cup spring bolt 22 abuts the left end of the spring element 24 with a projection. On the right end of the spring element 24, lying against the cup springs 24, is a nut 222 which is screwed onto the right end of the cup spring bolt 22. The cup spring bolt 22 is under spring tension of this spring element 24 for movements to the left and right by means of the cup springs of the spring element 24 which are already pretensioned between the housing and the cover 25 of the workpiece gripper 10 and also by means of a corresponding extension of these cup springs between the cup spring bolt 22 and its nut 222.

The coupler 21 is rotated counterclockwise against the force of the spring element 24, with a movement of the rammer 20 to the left by the drive element 16. As is further explained in conjunction with FIG. 5, the gripping jaws of the workpiece gripper are securely drivably connected to the coupler 21. The displacement of the rammer 20 and rotation of the coupler 21 counter to the spring tension results in the opening of internal gripping elements of the workpiece gripper. Upon release of the rammer 20 the gripping state is such that the spring tension is supplied solely by the spring element 24.

As already stated in the example shown, the cup spring bolt 22 is spring-loaded in both directions by the spring element 24. Thus the workpiece gripper 10 is suited to both internal and external gripping. With external gripping, rotation of the coupler clockwise on axle 34, i.e., a further displacement of the cup spring bolt 22 to the left, results in the opening of the gripping process. The approximate point at which no internal or external gripping force is exerted by the gripping elements is that point shown in FIG. 2 at which the spring element 24 is at equilibrium with the cup spring bolt 22.

To carry out the rotation of the coupler 21 to the right, a further rammer or push rod 26 is provided which corresponds in form and arrangement to the rammer 20 previously described, of which only the left end which abuts the coupler is shown. Because of the position of the displaced section C-D (see also FIG. 4) on which the section cuts through the cup spring bolt 22 in the lower part of the workpiece gripper 10, the rammer 26 itself cannot be seen in FIG. 2 as it lies facing the cup spring bolt 22 behind the relevant section plane of FIG. 2. The same is also true of the lower end of coupler 21 which is shown in phantom in FIG. 2 and lies behind the slide ring 23 and the cup spring bolt 22, yet in the same plane as the rammers 20 and 26, parallel to the drawing plane of FIG. 2.

Figure 3:
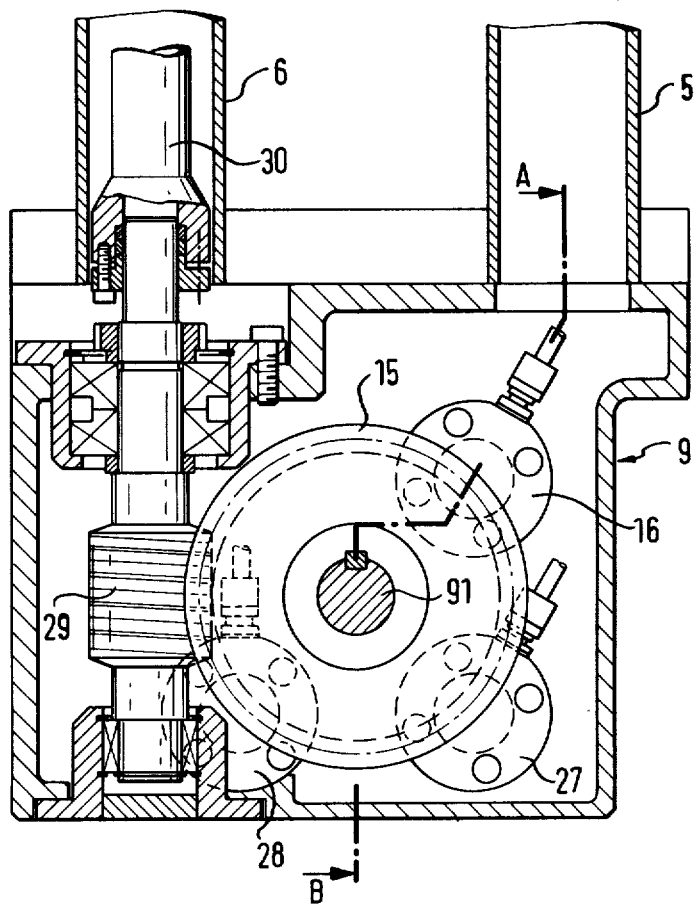
FIG. 3 is a sectional view taken along the line III—III in FIG. 2 from which the location of section A-B may also be seen.
Figure 4:
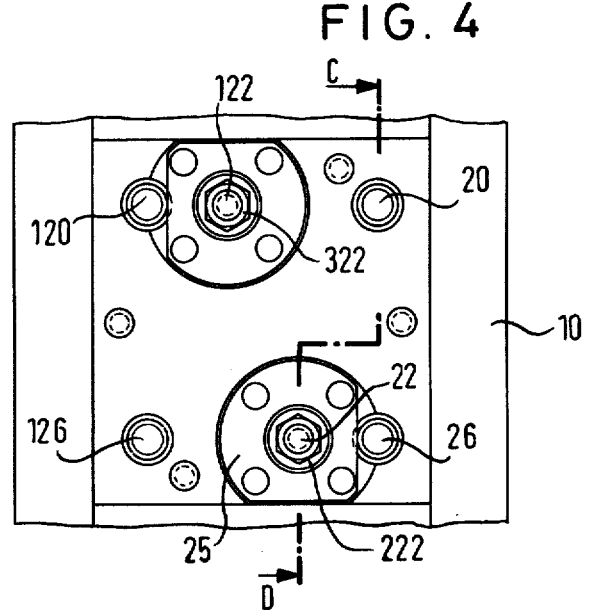
FIG. 4 is a sectional view taken along the line IV—IV in FIG. 2 from which the location of section C-D in FIG. 2 may be seen.

For a better understanding of both the position of rammers 20 and 26 and the drive element 16 relative to other drive elements, reference should be made to FIGS. 3 and 4. FIG. 3 shows section III—III' of the support arm 9 with the guide rods 5 and 6. FIG. 4 shows section IV—IV' of the workpiece gripper 10.

Features common to FIGS. 1 and 2 and to FIGS. 3 and 4 which have previously been described in FIGS. 1 and 2, have been given the same references in FIGS. 3 and 4.

In addition to the drive element 16 another drive element 27 is shown in FIG. 3. They are both hydraulic piston and cylinder units. The drive element 27 is therefore not visible in section in FIG. 2 because it lies, corresponding to section A-B, behind the respective drawing plane of FIG. 2. This piston and cylinder unit 27 has, like unit 16, a spring-loaded piston (FIG. 2, pointing to the right) with a piston rod (FIG. 2, pointing to the left). Both the piston and piston rod of the piston and cylinder unit of the drive element 27 align with the previously mentioned rammer 26 and the lower end of the coupler 21. As has already been stated, the coupler 21, by activation of the drive element 27, can be made to disengage an external gripping action, with the workpiece gripper 10 and support arm 9 in the position shown in FIG. 2. However, activation of the drive element 16 serves to disengage an internal gripping action. Support arm 9 and workpiece gripper 10 are therefore advantageously constructed to carry out both internal and external gripping functions, with the force of one bilaterally operative spring element 24 effective for both functions.

In FIG. 3 another drive element 28 is shown similar to elements 16 and 27, and which is displaced 180° from drive element 16. If the workpiece gripper is rotated 180° counterclockwise as viewed in FIG. 3 around axle 91, the rammer can then be moved with a further drive element 28. Thus, an internally-gripped chuck part can be deposited or a new workpiece picked up in the direction of the workpiece gripper 10 which is opposite to the chuck 2. A fourth drive element (not shown) can be provided to release an external gripping action in a position of 180° rotation.

As a comparison of FIGS. 3 and 4 in particular shows, the rammer 20 aligns with the drive element 27 at 90° of clockwise rotation. As each drive element of support arm 9 exerts a pressure force in the same direction, they can all, depending on whichever rammer aligns with its respective drive element for whichever function on whichever side of the double gripper 10, carry out the function allocated to the respective rammers 20, 26 of releasing the gripping elements for external or internal gripping.

The worm gear 29 located on the drive shaft 30 meshes with worm wheel 15 and serves to drive the rotating shaft 91.

Apart from the previously mentioned rammers 20 and 26, FIG. 4 shows the other push rods or rammers 120 and 126. The rammers 120 and 126 belong to a second coupler not shown which is identical to the coupler 21 and aligns with the rammers 120 and 126 in a similar way to that in which coupler 11 aligns for rammer 20 and 26. 122 is the cup spring bolt corresponding to the cup spring bolt 22 with its own nut corresponding to part 222. The cup spring bolt 122 and nut 322 belong to a more detailed spring element, not shown, but situated behind the drawing plane in FIG. 4. Parts 120, 126, 122, 322 and the additional spring element belong to the second side of the workpiece double gripper.

Figure 5:
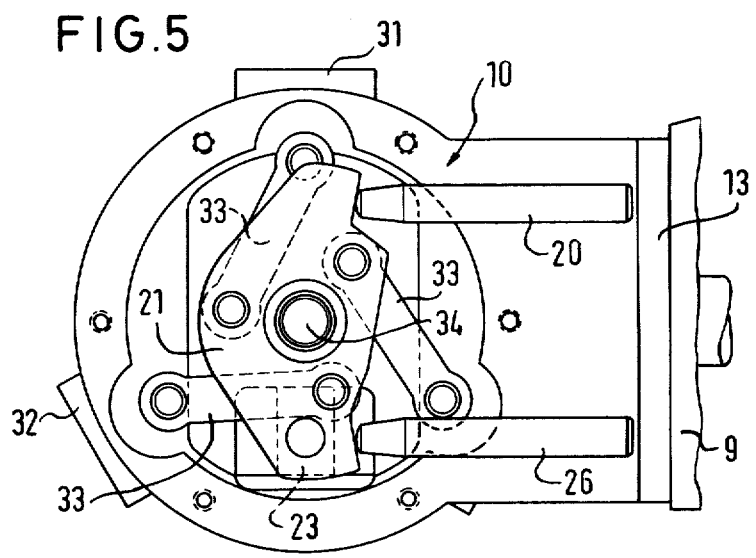
FIG. 5 is a sectional view through the workpiece gripper of FIG. 2 on a plane parallel thereto and displaced some way behind it.

FIG. 5 shows the connection between the coupler and the gripping elements (of which both gripping elements 31 and 32 are shown) with the aid of three connecting rods. For external gripping these connecting rods 33 also operate as pull rods. FIG. 5 shows the way in which the coupling element 21 coordinates the movement of the rammers 26 and 20 in order to release the internal and external gripping actions and to grip with the force produced by the spring element. It should be noted that the coupler 21 and the rammers 20 and 26 in FIG. 5 lie on a plane located in front of the connecting rods 33.

Figure 6:
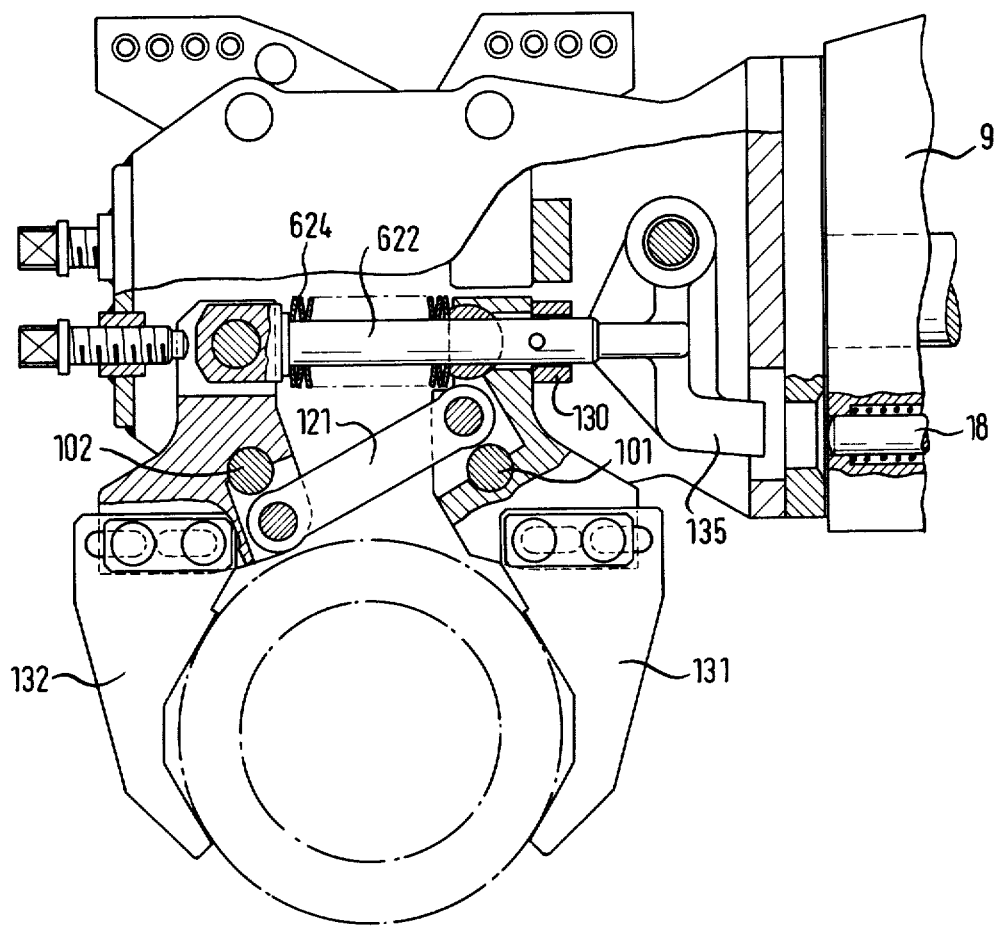
FIG. 6 is a transverse section of a workpiece gripper for gripping shafts.

FIG. 6 shows a workpiece gripper 14 in the form of a shaft gripper. The gripping fingers of the upper gripper are not shown.

The piston rod 18 of one drive element acts on a lever 135 which acts on gripping fingers 131, 132 via a thrust piece 130. Gripping fingers 131, 132 are securely fixed to the housing by axles 101, 102. They are connected to each other by means of the coupler 121. The cup springs 624 which produce the gripping force are incorporated on a cup spring bolt 622 which supplies the necessary gripping force by way of comparison to the cup springs of the spring element 24 and in addition, permits a slight correction of alignment. The gripper fingers 131, 132 are constructed separately in the example shown in order that the gripping zone may be enlarged by displacement.

I claim:

1. A workpiece handling apparatus comprising:
   a support arm with a workpiece gripper mounting surface;
   a detachable workpiece gripper with a mounting surface for mating engagement with said gripper mounting surface;
   a movable workpiece gripping element carried by said workpiece gripper;
   urging means connected with said workpiece gripping element for holding the gripping element in one position;
   a piston and cylinder actuator carried by said support arm having a piston rod operable to bridge the mating mounting surfaces and to operably engage the said workpiece gripping element, the piston being operable to move the piston rod in one direction to move the workpiece gripping element from said one position to a second position against the urging of the urging means, said piston rod being retractable beyond said mating mounting surfaces so that the workpiece gripper may readily be rotated relative to said support arm and may readily be detached from the support arm and another workpiece gripper substituted therefor.

2. The workpiece handling apparatus of claim 1 further including a push rod carried by the workpiece gripper operatively associated with the piston for moving the workpiece gripping element when the piston is operated.

3. The workpiece handling apparatus of claim 2, wherein the piston rod extends into the workpiece gripper to engage the push rod when the piston is operated.

4. The workpiece handling apparatus of claim 1 or 3, wherein the urging means comprises a spring.

5. The workpiece handling apparatus of claim 1, further including a coupler operatively associated with the workpiece gripping element and engaging the urging means wherein the coupler is responsive to operation of the piston.

6. The workpiece handling apparatus of claim 5, further including a push rod carried by the workpiece gripper engaging the coupler, the piston rod extending into the workpiece gripper and engaging the push rod when the piston is operated.

7. The workpiece gripper of claim 1, wherein the workpiece gripper is rotatable to a number of positions relative to the support arm and further including a plurality of piston and cylinder actuators, one of the piston and cylinder actuators being operable to move the workpiece gripping elements when the workpiece gripper is in each of the rotational positions.

8. A workpiece handling apparatus having a workpiece gripper detachably disposed on a mounting surface of a support arm, the workpiece gripper having movable gripping elements for gripping a workpiece, comprising:
   a push rod carried by the gripper and operatively associated with the gripper and the gripping elements;
   a spring urging the gripping elements toward a neutral position;
   a coupler connecting the push rod and the spring to the gripping elements wherein the coupler is a lever having first and second ends which contact the push rod and the spring, respectively; and
   a piston and cylinder unit carried by the support arm having a piston rod extending through the mounting surface and engaging the push rod when the piston and cylinder unit is actuated for moving the gripping elements away from said neutral position.

9. The workpiece handling apparatus of claim 8, further including:
   a second push rod carried by the gripper having a first end which contacts the second end of the coupler; and
   a second piston and cylinder unit disposed within the support arm having a piston rod extending through the mounting surface and contacting a second end of the second push rod when the second piston and cylinder unit is actuated for moving the gripping elements away from the neutral position.

10. The workpiece handling apparatus of claim 9, wherein the workpiece gripper is rotatable to a number of rotational positions with respect to the support arm, and wherein the apparatus further includes a third piston and cylinder unit disposed within the support arm having a piston rod extending through the mounting surface when the third piston and cylinder unit is actuated, the first, second and third piston and cylinder units being carried by the support arm such that the first push rod is contacted by the piston rod of one of the piston and cylinder units when the unit is actuated depending upon the rotational position of the gripper.

11. The workpiece handling apparatus of claim 9, wherein the workpiece gripper is rotatable to a number of rotational positions with respect to the support arm, and wherein the apparatus further includes third and fourth piston and cylinder units within the support arm each having a piston rod extending through the mounting surface when the piston and cylinder unit is actuated, the first through fourth piston and cylinder units being located within the support arm such that the first push rod is contacted by the piston rod of one of the piston and cylinder units and the second push rod is contacted by the piston rod of a different piston and cylinder unit when the units are actuated depending upon the rotational position of the gripper.

12. A workpiece handling apparatus having a workpiece gripper detachably disposed on a mounting surface of a support arm, the workpiece gripper having movable gripping elements for gripping a workpiece, comprising:
   a push rod carried by the gripper and operatively associated with the gripper and the gripping elements;
   a spring urging the gripping elements toward a neutral position;
   a coupler connecting the push rod and the spring to the gripping elements wherein the coupler is connected to the gripping elements by connecting rods and is rotatably mounted such that rotation thereof in one direction moves the gripping elements in a first direction and rotation in the other direction moves the gripping elements in a second direction opposite the first direction for allowing either internal or external gripping; and a piston and cylinder unit carried by the support arm having a piston rod extending through the mounting surface and engaging the push rod when the piston and cylinder unit is actuated for moving the gripping elements away from said neutral position.

13. A workpiece handling apparatus having a workpiece gripper detachably disposed on a mounting surface of a support arm, the workpiece having movably gripping elements for gripping a workpiece, comprising:

a push rod carried by the gripper and operatively associated with the gripper and the gripping elements;

a spring urging the gripping elements toward a neutral position;

a piston and cylinder unit carried by the support arm having a piston rod extending through the mounting surface and engaging the push rod when the piston and cylinder unit is actuated for moving the gripping elements away from said neutral position;

wherein the workpiece gripper is rotatable to a number of rotational positions with respect to the support arm, and wherein the apparatus further includes a second piston and cylinder unit disposed within the support arm having a piston rod extending through the mounting surface and contacting the push rod to move the gripping elements away from the neutral position when the workpiece gripper is in one of the rotational positions.

* * * * *